United States Patent [19]

Moreau et al.

[11] Patent Number: 5,672,195
[45] Date of Patent: Sep. 30, 1997

[54] PROCESS FOR THE SEPARATION OF MIXTURES OF OXYGEN AND OF NITROGEN EMPLOYING AN ADSORBENT WITH IMPROVED POROSITY

[75] Inventors: Serge Moreau, Velizy Villacoublay; Christian Barbe, Fontenay Sous Bois, both of France

[73] Assignee: L'Air Liquide, Societe Anonyme pour l'Etude et l'Exploitation des Procedes Georges Claude, Paris Cedex, France

[21] Appl. No.: 625,346

[22] Filed: Apr. 1, 1996

[30] Foreign Application Priority Data

Jan. 16, 1996 [FR] France ................ 96 00409

[51] Int. Cl.[6] ........................ B01D 53/047
[52] U.S. Cl. ................ 95/96; 95/130; 95/902
[58] Field of Search .............. 95/96, 103, 130, 95/902

[56] References Cited

U.S. PATENT DOCUMENTS

| | | | |
|---|---|---|---|
| 3,085,379 | 4/1963 | Kiyonaga et al. | 95/96 |
| 3,140,931 | 7/1964 | McRobbie | 95/130 X |
| 3,140,932 | 7/1964 | McKee | 95/130 |
| 3,140,933 | 7/1964 | McKee | 95/130 |
| 3,155,468 | 11/1964 | de Montgarevil et al. | 95/103 |
| 3,164,454 | 1/1965 | Wilson | 95/130 |
| 3,237,377 | 3/1966 | Skarstrom | 95/103 X |
| 3,564,816 | 2/1971 | Batta | 95/130 X |
| 3,636,679 | 1/1972 | Batta | 95/130 X |
| 3,738,087 | 6/1973 | McCombs | 95/130 X |
| 3,923,477 | 12/1975 | Armond et al. | 95/103 |
| 4,481,018 | 11/1984 | Coe et al. | 95/130 |
| 4,539,019 | 9/1985 | Koch | 95/96 X |
| 4,614,525 | 9/1986 | Reiss | 95/96 |
| 4,684,377 | 8/1987 | Haruna et al. | 95/130 X |
| 4,925,460 | 5/1990 | Coe et al. | 95/96 |
| 4,969,935 | 11/1990 | Hay | 95/130 X |
| 5,074,892 | 12/1991 | Leavitt | 95/96 |
| 5,114,440 | 5/1992 | Reiss | 95/96 |
| 5,152,813 | 10/1992 | Coe et al. | 95/103 |
| 5,203,887 | 4/1993 | Toussaint | 95/96 X |
| 5,226,933 | 7/1993 | Knaebel et al. | 95/96 |

*Primary Examiner*—Robert Spitzer
*Attorney, Agent, or Firm*—Young & Thompson

[57] ABSTRACT

The invention relates to a process for the separation of a mixture of oxygen and nitrogen into each of its constituents, including bringing the mixture to be separated, in an adsorption zone, into contact with a selective adsorbent for nitrogen, the adsorbent being an agglomerated zeolite exhibiting an Si/Al ratio lower than 5, a porosity of between 0.38 and 0.60 and a parameter $a_k$ of at least $0.5\ s^{-1}$, the parameter $a_k$ characterizing the kinetics of adsorption of nitrogen on the adsorbent in the adsorption zone in accordance with the Linear Driving Force model, it being understood that when the adsorbent is a zeolite containing lithium its porosity can vary between 0.25 and 0.60.

19 Claims, 6 Drawing Sheets

PROCESS FOR THE SEPARATION OF MIXTURES OF OXYGEN AND OF NITROGEN EMPLOYING AN ADSORBENT WITH IMPROVED POROSITY

FIELD OF THE INVENTION

This invention relates to a process for separation of a mixture of oxygen and nitrogen and more particularly an improvement to the conventional processes of the PSA/VSA type or processes using adsorption by pressure variation optionally including a stage of desorption at subatmospheric pressure, by using an improved adsorber.

BACKGROUND OF THE INVENTION

The recovery of oxygen from mixtures of oxygen and nitrogen such as air is of great interest where industry is concerned, since oxygen finds many applications in numerous fields, such as steel manufacture, medicine, the welding of metals, paper manufacture, combustion or decontamination.

Many separation processes involve bringing the gaseous mixture to be separated, containing nitrogen and oxygen, in an adsorption zone, into contact with a zeolite permitting a selective adsorption of the nitrogen relative to the oxygen so as to recover an oxygen-enriched gas at the exit of the adsorption zone, followed by the regeneration of the zeolite by desorption of the nitrogen. During these different stages the temperature and pressure conditions are fixed so as to optimize the nitrogen adsorption and desorption efficiency. It is widely known that low temperatures promote the adsorption whereas elevated temperatures facilitate the desorption processes of nitrogen.

The selective adsorption of nitrogen on a zeolite is the result of strong interactions between the quadrupole moment of the nitrogen molecule and the cations of the zeolite.

It has been possible to ascertain, in fact, that a higher adsorption efficiency is obtained by increasing the charge and the size of the cations in the zeolite. In this direction it has been proposed to employ, as adsorbent material, zeolites exchanged with metal cations such as cations of alkali metals. Patents U.S. Pat. No. 5,203,887, U.S. Pat. No. 3,140,932 and U.S. Pat. No. 4,859,217 illustrate more particularly the better selectivity of lithium-exchanged zeolites with regard to nitrogen when the latter is mixed with less polar gaseous substances such as oxygen.

However, the high costs of manufacture of zeolites containing lithium have restricted their development in the technology of separation of mixtures of nitrogen and oxygen by making use of the PSA/VSA processes.

It is generally accepted that the diffusion of oxygen and of nitrogen in the macroporous network of the zeolites commonly employed in the PSA/VSA processes is so fast that it does not affect the efficiency of nitrogen adsorption. In other words, the time of travel of the gaseous mixture that is to be separated to the adsorption sites situated at the very core of the zeolite is assumed to be negligible; with this hypothesis, the porosity of the zeolite, which is a direct measure of the volume fraction of the zeolite which is occupied by the cavities, has not, until now, been considered to be a determining factor from the viewpoint of the efficiency of adsorption.

Various considerations related to the overall performance of the PSA/VSA process have meanwhile resulted in this porosity being limited. Simple reasoning makes it possible to forecast, in fact, that an increase in the porosity is accompanied by a reduction in the adsorption sites and thus a decrease in the nitrogen adsorption capacity per unit volume of adsorbent. Now, the use of a minimum volume of adsorbent is desirable, to limit the cost of the plants and the operating cost when making use of the PSA/VSA processes; the porosity of the zeolites commonly employed has thus been deliberately kept low.

Furthermore, it follows from U.S. Pat. No. 5,258,060 that it is wholly advantageous to select adsorbents of high density and therefore of relatively low porosity, so as to limit the temperature variations within the adsorbent mass, variations that have an unfavourable influence on the efficiency of the nitrogen desorption and adsorption mechanisms.

In practice the porosity of the conventional industrial zeolites used in the PSA/VSA processes is lower than 0.36. To give an example, Ruthven discloses, in his work "Adsorption principles and adsorption processes", porosity values which lie in the range 0.32–0.36 for synthetic zeolites. Similarly, Breck has evaluated the porosity of an industrial zeolite 5A as 0.315–0.34 (cf. "Zeolite molecular sieves", John Wiley & Sons, 1974, 750).

However, the present invention disputes the validity of these prejudices of the state of the art by revealing the possibility of improving the performance of the VSA/PSA processes by increasing the porosity and by doing this within well-determined limits.

The output efficiency of a VSA/PSA process is a measure of the volume of oxygen recovered per unit (mass-based or volume-based) of adsorbent. Until now, insofar as the starting point was the principle that an equilibrium between the gaseous phase and the zeolite phase was achieved immediately after these two phases were placed in contact (on the assumption of a practically immediate diffusion of the gaseous mixture to be separated within the macroporous network), it was assumed that the duration of the nitrogen adsorption phase, before a change to the desorption stage, was determined by the quantity of adsorbent which was employed; it follows especially from U.S. Pat. No. 5,074, 892 that the quantity of adsorbent needed to produce 1 m$^3$ of oxygen (generally denoted by BSF in the technology) is proportional to the duration of the adsorption stage. The principle of the equilibrium between the gaseous phase and the zeolite phase is described more particularly in U.S. Pat. No. 5,258,060 and U.S. Pat. No. 5,266,102

SUMMARY OF THE INVENTION

Now, the invention is based on the discovery that by adjusting the porosity of the adsorbent to an optimum value it is possible to accelerate the adsorption kinetics and therefore to decrease the duration of placing the gaseous mixture in contact with the adsorbent.

It is thus possible to arrive at an overall improvement in the hourly space time yield of the PSA/VSA cycles.

According to the invention, it is therefore an increase in the porosity in relation to the conventional values of porosity of the commercially available zeolites that permits an improvement in the output efficiency, a result which is all the more unexpected since it runs against the prejudices of the technology.

More precisely, the invention provides a process for the separation of a mixture of oxygen and nitrogen into each of its constituents, including bringing the mixture to be separated, in an adsorption zone, into contact with a selective adsorbent for nitrogen, the adsorbent being an agglomerated zeolite exhibiting an Si/Al ratio lower than 5, a porosity of between 0.38 and 0.60 and a parameter $a_k$ of at least 0.5 s$^{-1}$, the parameter $a_k$ characterizing the kinetics of adsorption of nitrogen on the adsorbent in the adsorption zone, in accordance with the Linear Driving Force model, it being understood that when the adsorbent is a zeolite containing lithium its porosity may vary between 0.25 and 0.60.

The volume ratio of the oxygen to the nitrogen characterizing the initial mixture may vary in any manner.

The process of the invention may be employed more generally to enrich in oxygen a mixture of nitrogen and oxygen also containing argon, such as air. In this case the oxygen purity obtained after making use of the process of the invention is at most 95.5% by volume, the latter remaining associated with argon and possibly containing some percentage of nitrogen.

Thus, within the scope of the present application pure oxygen is intended to mean 95.5% oxygen.

According to a preferred embodiment the initial mixture is a mixture of oxygen and nitrogen containing more than 10% by volume of nitrogen. Zeolites are a group of natural or synthetic, hydrated metal aluminosilicates most of which have a crystalline structure. Zeolites differ from each other as a result of their chemical composition, their crystal structure and their physical properties, such as their X-ray diffraction pattern.

In outline, zeolite crystals consist of overlapping $SiO_4$ and $AlO_4$ tetrahedral lattices, each oxygen atom forming part of an $SiO_4$ lattice and of a $AlO_4$ lattice, with the result that the ratio of the oxygen atoms to the silicon and aluminium atoms is two. A number of cations, for example cations of alkali and alkaline-earth metals such as sodium, potassium, calcium and magnesium, which are included in the crystal lattice, ensure the electrical neutrality of the zeolite.

An Si/Al ratio lower than 5 is characteristic of the zeolites that can be employed as an adsorbent in the process of the invention. It should be noted that the efficiency of adsorption is improved at low Si/Al ratios, the quantity of cations present in the zeolite being greater. This ratio is preferably between 1 and 1.5.

The zeolites that can be employed according to the invention are, for example, mordenite, erionite, chabazite or the zeolites A, D, R, T, X, Y and L.

For a more precise description of these zeolites reference will be made to the patents and patent applications U.S. Ser. No. 728,057, U.S. Ser. No. 862,062, U.S. Ser. No. 711,565, U.S. Ser. No. 680,383, U.S. Ser. No. 680,381, U.S. Pat. No. 2,882,243, U.S. Pat. No. 2,950,952, U.S. Pat. No. 2,882,244 and U.S. Pat. No. 3,030,181.

Among these zeolites, zeolites 5A, 13X and CaX are more particularly preferred.

In accordance with the invention it is also possible to resort to zeolites exchanged with one or a number of metal cations such as the cations derived from alkali metals, alkaline-earth metals and transition metals. Those derived from calcium, zinc or lithium are preferred as metal cations. Zeolites exchanged with lithium are more especially preferred in the group of the zeolites exchanged with metal cations.

Zeolites exchanged with lithium and exhibiting divalent metal cations such as $Ca^{2+}$ in their crystal lattice form a second preferred group of zeolites.

It goes without saying that the adsorbent of the invention may consist of a mixture of these various zeolites in any ratios.

More precisely, the process of the invention employs zeolite agglomerates in which the zeolite crystals described above are associated with each other by an inorganic binder which is inert towards oxygen and nitrogen. Inorganic binders which may be mentioned are silica, alumina, aluminosilicates, clays such as bentonite, kaolin and attapulgite or any other equivalent compound of the technology.

It must be understood, however, that the zeolite agglomerates that can be employed according to the invention may not contain any binder. Such agglomerates are simply obtained by subsequent treatment of the binder-based zeolite agglomerates. More precisely, this treatment includes a second crystallization stage intended to convert the binder into a zeolite phase by baking at a temperature of between 60° and 100° C.

Such a conversion is possible only in the case of some particular binders such as clay.

The macropores of the zeolite correspond to the interstitial spaces arranged between the crystals constituting the agglomerates; the porosity of the zeolite is a measure of the total volume occupied by the macropores.

Within the scope of the invention the porosity of the adsorbent is a fundamental parameter of the process for separation of the mixture of oxygen and nitrogen.

A porosity of between 0.38 and 0.60 is essential for producing the desired improvement in the hourly space time yield.

In the case of zeolites exchanged with lithium this porosity may vary within wider limits, namely between 0.25 and 0.60.

The preferred ranges of variation in porosity are generally 0.38 to 0.50 and, in the case of zeolites exchanged with lithium, 0.30 to 0.60, better still 0.38 to 0.55.

In the case of porosity values lower than 0.38 and 0.25 respectively, the adsorption kinetics are only mediocre and do not permit a reduction in the contact time between the zeolite phase and the gaseous mixture. It follows that no improvement in the hourly space time yield is observed in the case of such values.

Furthermore, porosity values higher than 0.60 are not desirable, insofar as the resulting adsorption capacity would be insufficient.

Thus, the best compromise between adsorption kinetics and adsorption capacity is obtained by keeping the porosity within the range of variation which has been indicated.

However, the porosity of the zeolite and its Si/Al ratio are not by themselves sufficient to characterize the adsorbent employed for optimizing the nitrogen adsorption kinetics. Other parameters, such as the radius of the zeolite particles, molecular diffusion and the tortuosity of the macropore network need to be taken into consideration. Now, such parameters are difficult to measure. Accordingly, rather than attempt to optimize each of these parameters, it has been found that it is possible to adapt the kinetic parameter $a_k$, as defined by D. M. Ruthven in "Principles of adsorption and adsorption processes", John Wiley & Sons, 1984, p. 174–178, or in "Pressure Swing adsorption", VCS Publishers, 1994, p. 45 and 46 and p. 180 to 183, or, again, in "Gas separation by adsorption processes", Yang Butterworth Publishers, 1987, p. 132–133, so as to obtain the best hourly space time yields.

In these various works the parameter $a_k$ quantifies the nitrogen adsorption kinetics in processes for separation of nitrogen/oxygen mixtures. More precisely, it is in the context of a modelling of nitrogen adsorption processes that the parameter $a_k$ has been defined. The model employed is commonly referred to in the art as the Linear Driving Force model.

Now, it has become apparent that an efficient optimization of the overall process for separation of nitrogen from the gaseous mixture could be obtained by keeping this parameter at a value higher than 0.5 s$^{-1}$ while fixing the porosity of the zeolite within the value range indicated above.

A value of $a_k$ of between 0.5 and 4 s$^{-1}$ is generally advantageous. According to a preferred embodiment $a_k$ takes any value between 1.5 and 4 s$^{-1}$.

The determination of the value of the parameter $a_k$ may be carried out in a simple way by a person skilled in the art.

When the adsorptivity of the zeolite increases linearly as a function of the pressure to which the adsorption zone, and hence the adsorbent, is subjected, it can be shown that the parameter $a_k$ satisfies the following equation:

$$a_k = 2 \frac{\mu}{\sigma^2} \quad (1)$$

where μ represents the mean exit time of the adsorption front and σ represents the temporal width of the adsorption front.

The quantities σ and μ can be easily obtained from the plot of the breakthrough curve characterizing the adsorption zone.

To produce a plot of this curve it is appropriate to adopt particular temperature, pressure and nitrogen concentration conditions in order that the equation (1) should apply, this being with a view to a simple evaluation of the parameter $a_k$; more precisely, an initial mixture of nitrogen and oxygen including less than 10% by volume of nitrogen will be chosen. In addition, the pressure within the adsorption zone will be fixed at a value which is lower than 2 bar ($2 \times 10^5$ Pa) while verifying that the latter belongs to the linearity region of the curve representing the variations in adsorptivity as a function of pressure.

These conditions are easily determined by a specialist.

The operating procedure followed for plotting the breakthrough curve is, for example, the following:

A mixture of nitrogen and oxygen is injected at one of the ends of the adsorption zone. In an initial period all of the nitrogen present in the mixture is adsorbed onto the adsorbent, pure oxygen being recovered at the exit of the adsorption zone. In the adsorption zone the adsorbent situated at the zone entry is the first to trap the nitrogen molecules from the $O_2/N_2$ mixture. During this same period the adsorbent near the exit of the adsorption zone, being exclusively in contact with an oxygen flow, remains intact. The boundary between the still active adsorbent situated on the exit side of the adsorption zone and the adsorbent which is inactivated (following the adsorption of nitrogen molecules) located at the entry side of the adsorption zone is commonly referred to by the name of an adsorption front. Once formed, the latter moves forward progressively along the adsorption zone by means of the nitrogen molecules from the mixture to be separated.

It will be understood that once the adsorption front has reached the end of the adsorption zone, the gas recovered at the exit of the zone will contain nitrogen in addition to the expected oxygen, insofar as the whole of the bed of adsorbent present in the adsorption zone has become saturated.

Because of the complexity of the mechanisms of molecular diffusion and of the heterogeneity of the zeolite agglomerates, saturation of the adsorbent does not take place uniformly in the direction at right angles to the advance of the gaseous mixture within the adsorption zone. Thus, when this mixture reaches the end of the adsorption zone, the concentration of nitrogen in the mixture recovered at the exit gradually increases. Since the PSA/VSA process is intended to remove the nitrogen completely from the gaseous mixture to be purified, the adsorption stage must be stopped before all of the adsorbent is actually saturated, this being so that practically pure oxygen should be recovered at the exit of the adsorption zone.

The breakthrough curve represents the variation in the oxygen concentration at the exit of the adsorption zone as a function of time, the time 0 corresponding to the precise moment when the adsorption stage is initiated. This curve is defined by the equation:

$$c = f(t)$$

where c represents the concentration of oxygen in the gaseous mixture recovered at the exit, t is the time variable and f is the function representing the variations in the concentration c as a function of time t.

To determine the parameter $a_k$ the breakthrough curve must be recorded. This is done in a manner which is known per se, simply by measuring the concentration of oxygen in the gaseous mixture recovered at the exit of the adsorption zone at different moments.

The mean exit time μ of the front is calculated from the breakthrough curve f(t) according to the equation:

$$\mu = \frac{\int_0^\infty t \cdot f'(t) \cdot dt}{\int_0^\infty f'(t) \cdot dt}$$

where f'(t) represents the derivative of the function f(t) defined above.

Similarly, the temporal width of the front σ corresponds to the following equation:

$$\sigma^2 = \frac{\int_0^\infty (t-\mu)^2 \cdot f'(t) \cdot dt}{\int_0^\infty f'(t) \cdot dt}$$

where f'(t) also corresponds to the derivative of the function f(t).

Since the parameter $a_k$ is such that $$a_k = 2 \frac{\mu}{\sigma^2} \quad (1)$$

it is easily determined from the values of μ and σ calculated in this way.

The zeolite agglomerates employed as an adsorbent in the process of the invention are selective for nitrogen, which implies that the mean diameter of the macropores is sufficient to allow the diffusion of nitrogen in the region of the adsorption sites of the adsorbent.

The mean size of the macropores is preferably greater than 0.35 μm and in the case of zeolite exchanged with lithium greater than 0.25 μm.

Commercially available zeolite agglomerates are not suitable for making use of the process of the invention, essentially in view of their porosity, which is lower than 0.36.

A person skilled in the art will know how to adapt the operating conditions of the known processes for the manufacture of zeolite agglomerates so as to obtain zeolites exhibiting the appropriate porosity.

The adsorbent of the invention can, for example, be prepared by mixing a crystalline zeolite powder with water and a binder, also in powder form, and then spraying this mixture onto zeolite agglomerates acting as agglomeration nuclei exhibiting a porosity which is as close as possible to that being aimed at. During the spraying the zeolite agglomerates are subjected to a continuous rotation about themselves. This can be brought about by placing the agglomerates in a reactor which is in rotation about itself around an axis of rotation, the axis of rotation being preferably tilted in relation to the vertical direction. Agglomerates in the form of beads are obtained by this process, which is commonly referred to in the technology as a "snowball" process.

The agglomerates thus obtained are next subjected to baking at a temperature of between approximately 500° and 700° C., preferably a temperature close to 600° C.

As example of a binder, a person skilled in the art will be capable of employing clay such as kaolin, silica or alumina.

With a view to controlling the porosity of the agglomerates thus manufactured, a person skilled in the art is aware that he or she can adjust various parameters such as the inclination and the rate of rotation of the axis of rotation of the reactor, the duration of the spraying stage or the rate of addition of the reactants during the formation of the water/binder/zeolite powder mixture. A certain quantity of pore-forming organic substances may even optionally be added to the water/binder/zeolite mixture. At the beginning of baking the decomposition of these substances causes a gaseous phase to be released, which swells the agglomerate.

Other processes allow the preparation of the agglomerated zeolites that can be employed for making use of the process of the invention. Thus, in an alternative form, it is possible to employ a kneading/extrusion process, which produces zeolite agglomerates in the form of threads.

The zeolite powders employed as starting material are commercially available, especially from companies such as Bayer, Grace, Davison, Tosoh and Ceca. Nevertheless, a person skilled in the art will be capable of easily preparing them by making use of the processes described in the technology.

Such crystalline zeolites may, in particular, be synthesized from metal silicates and aluminates. It will be borne in mind that the choice of the initial reactants determines the nature of the cations enclosed in the crystal lattice of the zeolite.

This being so, the insertion of other cations is possible by ion exchange. Ion exchange processes are widely used in technology and are described in specialized works.

The ion exchange may, for example, be performed by percolation of a concentrated hot solution of the appropriate salt through a bed consisting of the zeolite to be exchanged.

The use of zeolite exchanged with lithium is particularly advantageous from the viewpoint of the efficiency of the separation, since nitrogen is adsorbed on this type of zeolite in a very preferential manner when compared with oxygen. A faujasite containing lithium and exchanged to at least 80% produces a clear improvement in the separation. However, zeolites containing lithium and exchanged to at least 86% are particularly preferred.

In the context of the invention, a zeolite exchanged to at least 80% or 86%, respectively, with lithium, is intended to mean a zeolite in which at least 80% or 86%, respectively, of the $AlO_2^-$ units are associated with lithium cations.

For the preparation of faujasites containing lithium it will be possible to employ the following operating procedure, starting with a crystalline zeolite of faujasite type: an aqueous solution of lithium salts, such as an aqueous solution of lithium chloride, the pH of which is adjusted between 8 and 10 by addition of lithia, is percolated through a column packed with faujasite and maintained at a temperature of between 70° and 95° C. This operation is continued for a sufficient period so as to exchange at least 80% of the cations of the zeolite. It is generally estimated that, to introduce a given quantity of lithium ions into the zeolite, the column must be eluted with 1.2 to 12 times this quantity of lithium ions. The volume of the solution of lithium salts which must be poured into the top of the column is thus easily determined, account being taken of the normality of the solution. An aqueous solution of lithium chloride the normality of which is between 0.5 and 1.5N, better still an approximately 1N aqueous solution of lithium chloride will be preferably employed. The temperature of the zeolite and that of the lithium chloride solution will be advantageously maintained at 95° C. throughout the ion exchange period.

Nevertheless, it must be understood that this operating method is suggested merely by way of illustration and that any other known process of the state of the art which makes it possible to obtain a zeolite of faujasite type exchanged with lithium may be used.

It will be noted that the degree of exchange can be adjusted in accordance with the volume and the composition of the aqueous solution of lithium chloride which is eluted through the column.

The economic advantages resulting from the use of the process of the invention, namely especially the better hourly space time yield, make it possible to compensate for the high cost of such zeolites.

Before use in the process of the invention a heat activation of the zeolite agglomerates is necessary; its purpose is to remove from the macroporous network forming the agglomerated zeolite most of the water of hydration which it contains. In fact, the presence of water of hydration is not desirable, insofar as it prevents the adsorption of the nitrogen molecules by occupying the adsorption sites of the zeolite.

The activation of the zeolite may be carried out by any of the methods which are known in the technology.

One method for activation of the zeolites consists in subjecting the zeolite to a pressure of approximately 0.1 to 10 atmospheres ($1\times10^4$ Pa to $1\times10^6$ Pa) while passing a stream of an inert gas through the bed of adsorbent consisting of the zeolite and while heating the zeolite to a temperature of between 300° and 65° C. at a rate of temperature rise of approximately 0.1° to 40° C. per minute.

In an alternative form, the zeolite may be activated by being kept in a vacuum of approximately 0.1 mbar ($1\times10^2$ Pa) or lower, while the zeolite is heated to a temperature of approximately 300° to 650° C. without any need to resort to flushing with an inert gas.

Another alternative consists in activating the zeolite by a process employing microwaves, as described in U.S. Pat. No. 4,322,394.

In order to produce oxygen continuously, it is known to arrange a certain number of beds of adsorbent in parallel, which are alternately subjected to a cycle of adsorption at high pressure and of desorption by lowering the pressure.

Such plants are used especially in PSA/VSA processes for adsorption using pressure variation. The treatment cycle to which each bed of adsorbent is subjected includes the stages consisting in:

a) passing a gaseous effluent consisting of a mixture of nitrogen and oxygen into an adsorption zone including a selective adsorbent for nitrogen, the said adsorbent being an agglomerated zeolite exhibiting an Si/Al ratio lower than 5, a porosity of between 0.38 and 0.60 and a parameter $a_k$, characterizing the kinetics of adsorption of nitrogen on the adsorbent in the adsorption zone in accordance with the Linear Driving Force model, of at least 0.5 s$^{-1}$, it being understood that, when the adsorbent is a zeolite containing lithium, its porosity may vary between 0.25 and 0.60, whereby the gaseous effluent is brought into contact with the zeolite, a gaseous effluent enriched in oxygen being recovered at the exit of the adsorption zone, the nitrogen being selectively adsorbed on the adsorbent;

b) desorbing the nitrogen adsorbed on the adsorbent present in the adsorption zone by lowering the partial pressure of nitrogen within the adsorption zone;

c) restoring the adsorption zone to pressure by the introduction of a stream of oxygen or air.

Thus, each bed of adsorbent passes cyclically through a high-pressure oxygen production stage a), a decompression stage b) and a recompression stage c).

According to a preferred alternative form of embodiment, the nitrogen is removed in stage b) through the entry of the adsorption zone.

Furthermore, when an oxygen stream is employed for the recompression of the adsorption zone, it is introduced countercurrentwise at the exit of the adsorption zone. On the other hand, when an air stream is employed in this stage, then it is introduced concurrently through the entry of the adsorption zone.

It is clear that an improvement in the yield and output efficiency and an improvement in the purity of the oxygen recovered at the exit are arrived at by adjusting the operating conditions of stage a) in accordance with the preferred embodiments which are described above.

Thus, the preferred option will be for the purification of oxygen/nitrogen mixtures including more than 10% by volume of nitrogen which will be brought, in an adsorption zone, into contact with an adsorbent consisting of a zeolite of the faujasite type exchanged to 86% with lithium, exhibiting an Si/Al ratio of between 1 and 1.5, a porosity of between 0.38 and 0.55, a value $a_k$ of the kinetic parameter of between 0.55 and 1 s$^{-1}$ and an adsorbent pore size greater than 0.25 μm.

The temperature of the adsorption zone is preferably maintained between −20° and +80° C., the adsorption pressure being between 1×10$^5$ and 1×10$^6$ Pa.

According to a preferred embodiment the pressure is maintained between 1×10$^4$ and 1×10$^5$ Pa during the desorption stage b).

The capacity of the beds of adsorbent is limited by the maximum size which can be employed either because of the mechanical stress of the individual particles of adsorbent or because of the maximum size which can be employed for conveying the receptacles containing the adsorbents. This is why the operation of 1 to 3 beds of adsorbents arranged in parallel is commonplace in the technology.

In order to optimize the PSA processes it is advantageous to introduce stages of pseudoequilibration of pressure between two beds of adsorbent.

BRIEF DESCRIPTION OF THE DRAWINGS

The invention is now described with reference to the examples of embodiment and to the figures.

Figure 4:
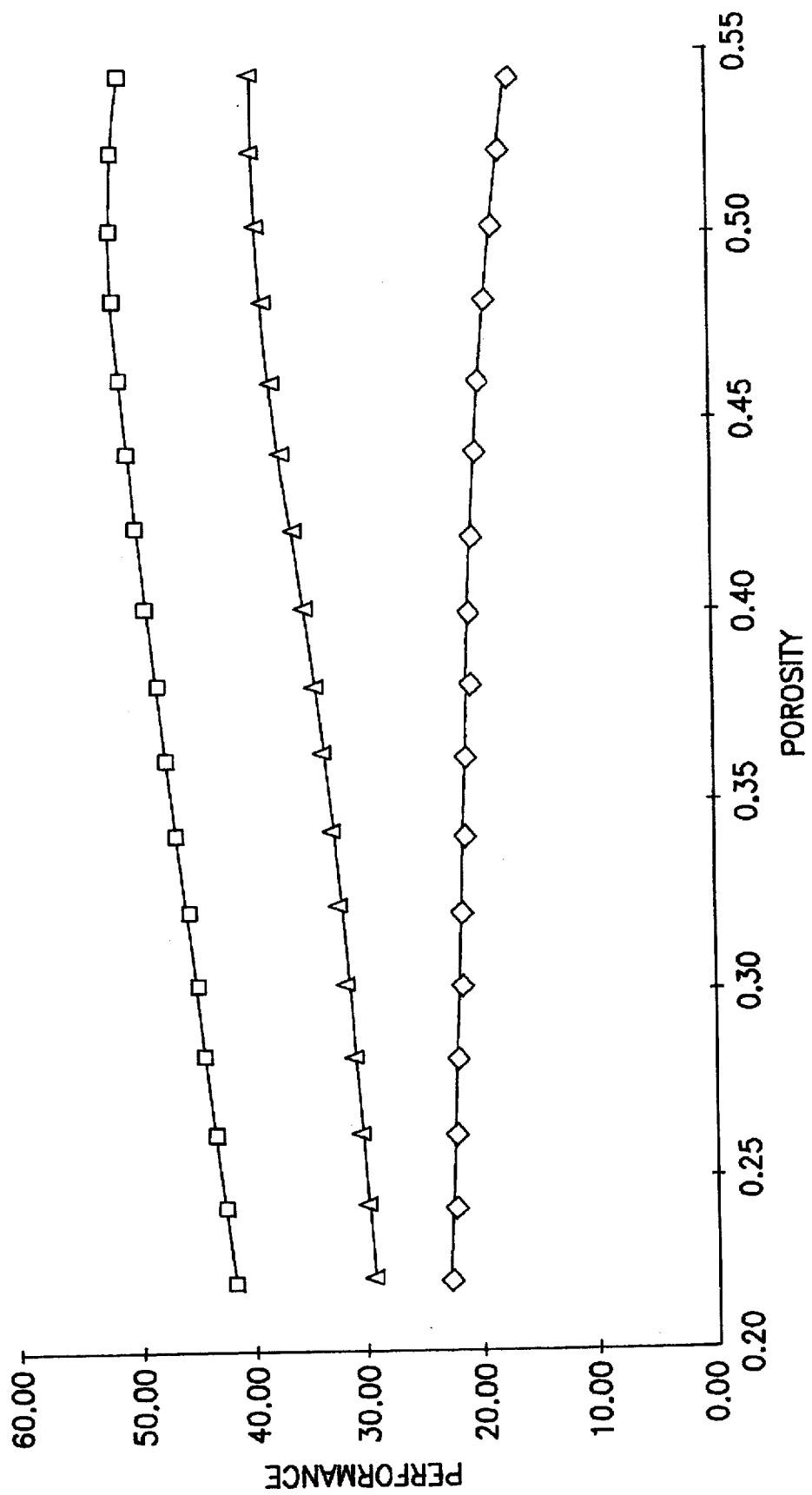
FIGS. 4 to 6 show the variations in the performance of the PSA cycle of FIG. 1 as a function of the porosity at a constant value of the kinetic parameter $a_k$, the performance in each case being expressed in terms of yield and of space time yield.
Figure 5:
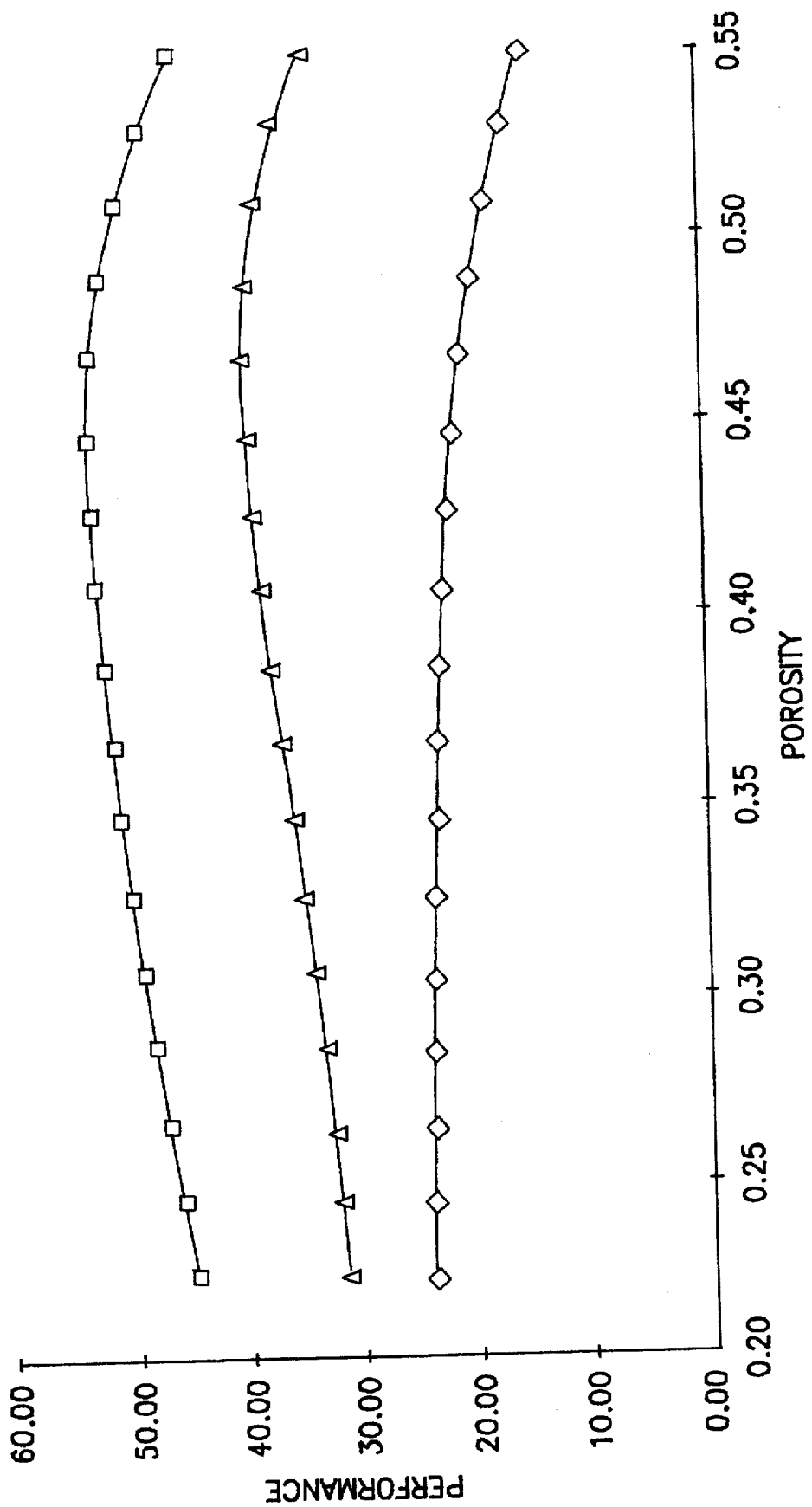
Figure 6:
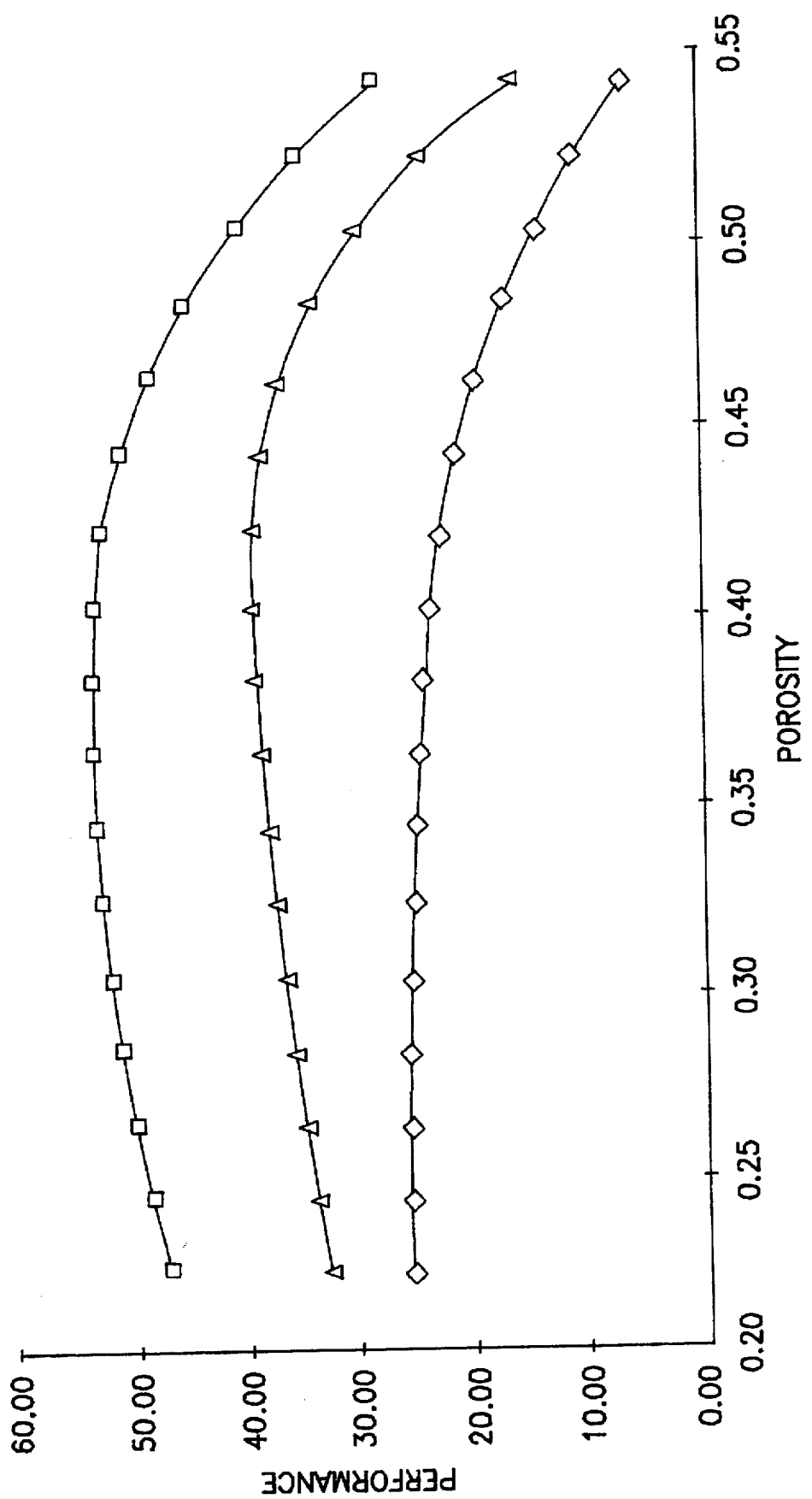

In the case of FIG. 4, $a_k$ has the value 0.55 s$^{-1}$; in the case of FIG. 5, $a_k$ has been fixed at 0.75 s$^{-1}$ and, in the case of FIG. 6, $a_k$ is 1 s$^{-1}$.

DETAILED DESCRIPTION OF THE INVENTION

Figure 1:
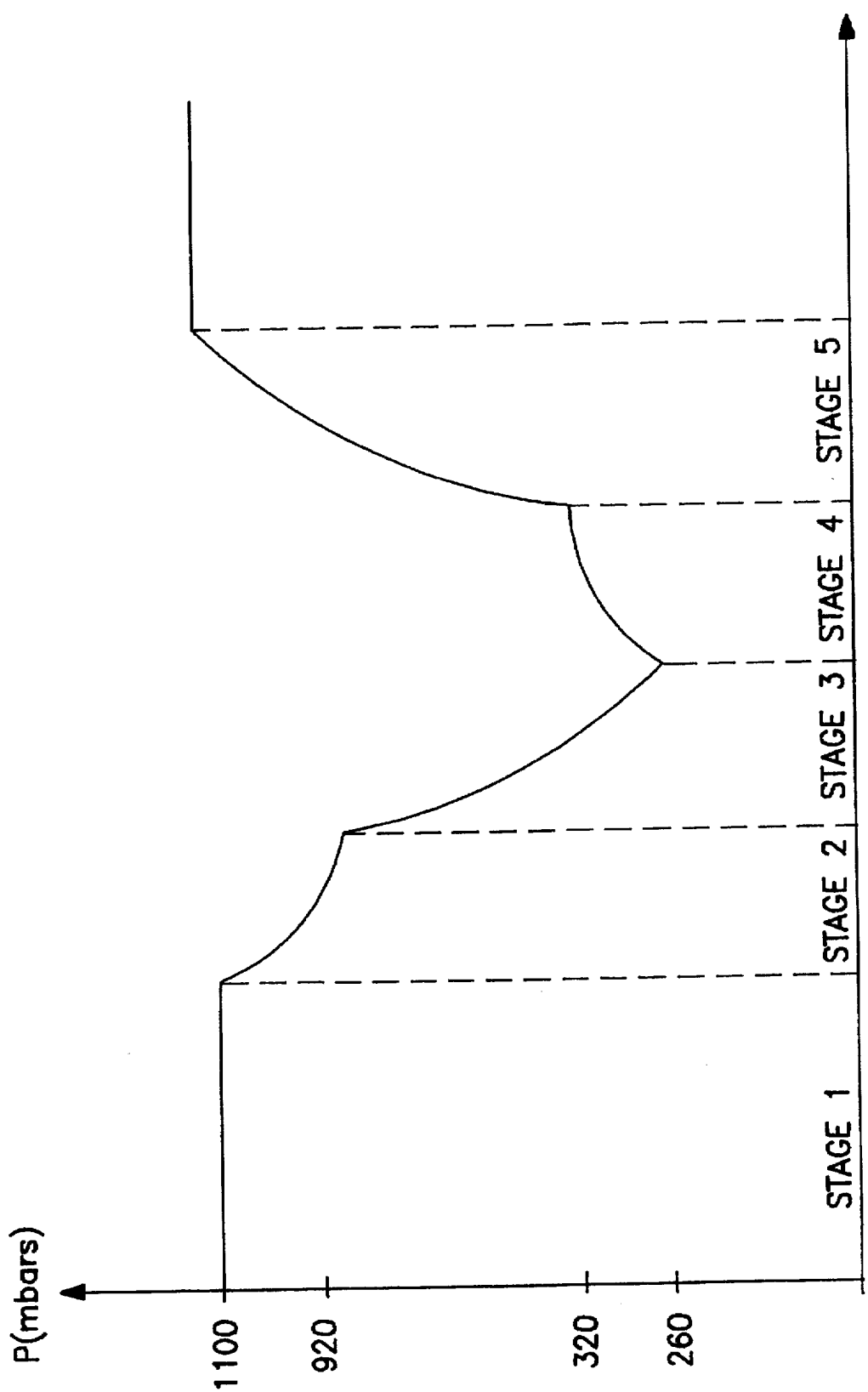
FIG. 1 shows the change in the pressure within an adsorption zone in the course of a cycle of treatment for purification of a gaseous mixture of oxygen and nitrogen by a PSA process employing a plant with three beds of adsorbent.

FIG. 1 is a diagrammatic representation of the change in the pressure within an adsorption zone in the course of a cycle of treatment of an O$_2$/N$_2$ mixture by a PSA process employing three beds of adsorbent in parallel.

From this figure it clearly follows that in this particular configuration each bed of adsorbent passes through five successive stages which can be briefly described as follows:

Stage 1: in a first period, the bed, initially saturated with oxygen, operates by adsorption, that is to say that a gas stream consisting of the N$_2$/O$_2$ mixture to be separated is passed continuously into the adsorption zone and that practically pure gaseous oxygen is recovered at the exit of the adsorption zone. Throughout this oxygen production stage the pressure within the adsorption zone is kept constant and equal to 1.1×10$^5$ Pa (1100 mbars);

Stage 2: before the nitrogen adsorption front has left the adsorption zone the production stage is interrupted, that is to say that the adsorption zone is no longer fed with O$_2$/N$_2$ mixture. At this precise moment the bed of adsorbent is connected to that of the two other beds of adsorbent entering a pseudoequilibration stage. Since the pressure prevailing within this second adsorption bed is lower than 1.1×10$^5$ Pa, the oxygen recovered at the exit of the first bed of adsorbent therefore passes into the second bed of adsorbent, and this contributes to lowering the pressure within the first adsorption zone;

Stage 3: in the next stage the nitrogen adsorbed on the adsorbent is desorbed by gradual reduction in the pressure within the adsorption zone; to do this, the entry of the adsorption zone is connected to a vacuum pump. During this decompression stage the adsorption zone changes from 0.92×10$^5$ Pa (920 mbars) to 0.26×10$^5$ Pa (260 m bars), it being understood that the exit of the adsorption zone is kept hermetically closed;

Stage 4: at the end of the decompression stage the adsorption zone changes to a pseudoequilibration stage. In order to raise the pressure of the adsorption zone, the latter is connected to that of the other two beds of adsorbent which, at the end of a production stage, enters Stage 2. Thus, the oxygen produced and recovered at the exit of this second bed of adsorbent contributes to increasing the pressure of the first bed of adsorbent. It must be understood, however, that this stage does not result in an equalization of pressure within the two beds of adsorbent, insofar as the stream of oxygen originating from the second bed of adsorbent is introduced countercurrentwise into the exit of the first adsorption zone and circulates freely within the first adsorption zone before being discharged through the entry of the said first adsorption zone;

Stage 5: when the pressure of the adsorption zone reaches 0.32×10$^5$ Pa (320 mbars), recompression of the bed of adsorbent is carried out. To do this, a flow of pure oxygen is introduced, countercurrentwise, by the exit of the said adsorption zone until the desired pressure of $1.1 \times 10^5$ Pa, that is 1100 mbars, is reached, the entry of the adsorption zone being kept hermetically closed.

EXAMPLES

To illustrate the invention, a high-output efficiency PSA cycle including five treatment stages carried out in three separate adsorption zones operating in parallel and at ambient temperature was simulated on a computer. The treatment cycle corresponds more precisely to that illustrated in FIG. 1 and discussed above.

In the envisaged simulation the complete treatment cycle lasts 90 seconds, namely 30 seconds of production (Stage 1), 30 seconds for the combined Stages 2 and 3 and 30 seconds for the combined Stages 4 and 5.

The output efficiency corresponds to the volume of oxygen produced, measured in standard temperature and pressure conditions, per mass or volume unit of adsorbent. The hourly space time yield, where the measured volume of oxygen is the volume of oxygen produced hourly, is distinguished from the output efficiency per cycle, where the measured volume of oxygen is the volume of oxygen produced during one PSA cycle (5 stages).

The yield is defined by the ratio of the volume of oxygen produced hourly, measured in standard temperature and pressure conditions, to the volume of oxygen present in the initial mixture, measured in standard temperature and pressure conditions.

The programme employed for the simulation is based on the principles of conservation of mass, conservation of enthalpy and conservation of the quantity of motion and employs the Linear Driving Force model for quantifying the kinetics of the solid-gas transfers within the mass of adsorbent.

More precisely, let us recall that, according to this Linear Driving Force model, the concentration q of the component adsorbed by the solid phase is given by the equation:

$$\frac{dq}{dt} = a_k \times (q^* - q)$$

where $a_k$ is the kinetic parameter defined above and $q^*$ is the concentration of the gaseous component adsorbed on the solid phase once the equilibrium between the gaseous phase and solid phase is reached.

The kinetic parameter $a_k$ is related to the macropore diffusion constant of the gaseous components in the macropore network of the adsorbent according to the following equation:

$$a_k = \Omega \times \frac{De}{R^2}$$

where R is the radius of the particle, $\Omega$ is a constant for a given cycle time (the value of $\Omega$ is approximately 15 in the case of a treatment cycle period of 90 seconds) and De is the effective macropore diffusion coefficient; more precisely, De satisfies the following equation:

$$De = \frac{Dm}{\tau} \times \frac{1}{1 + \frac{1-\epsilon}{\epsilon} \times K}$$

where:

$\epsilon$ is the porosity of the macropores;

K is Henry's constant;

$\tau$ is the tortuosity of the macropore network;

Dm is molecular diffusion;

Dp is the diffusion in the macropores;

De is the overall effective diffusion;

and $\tau = 1/(0.55 + 0.45 \times \epsilon)$

All these theoretical developments are set out in the "Principles of adsorption and adsorption processes", D. M. Ruthven, John Wiley & Sons, 1984, p. 174 and 178, or "Pressure swing adsorption", Ruthyen, Farooq and Knaebel, VCS Publishers, 1994, p. 45 and 46, p. 180 to 183 or, again, "Gas separation by adsorption processes", Yang, Butterworth Publishers, 1987, p. 132 and 133.

Example 1

In this example the influence of the kinetic parameter $a_k$ on the performance of the PSA cycle was investigated in terms of output efficiency (per cycle) and of hourly yield.

The adsorbent chosen as reference is a zeolite 5A with a porosity of 0.34, exhibiting an Si/Al ratio of 1, marketed by Bayer under reference KEG 407. When placed in the adsorption zone, this adsorbent exhibits a value of $a_k$ characterizing the adsorption of nitrogen of 0.75 s$^{-1}$.

Figure 2:
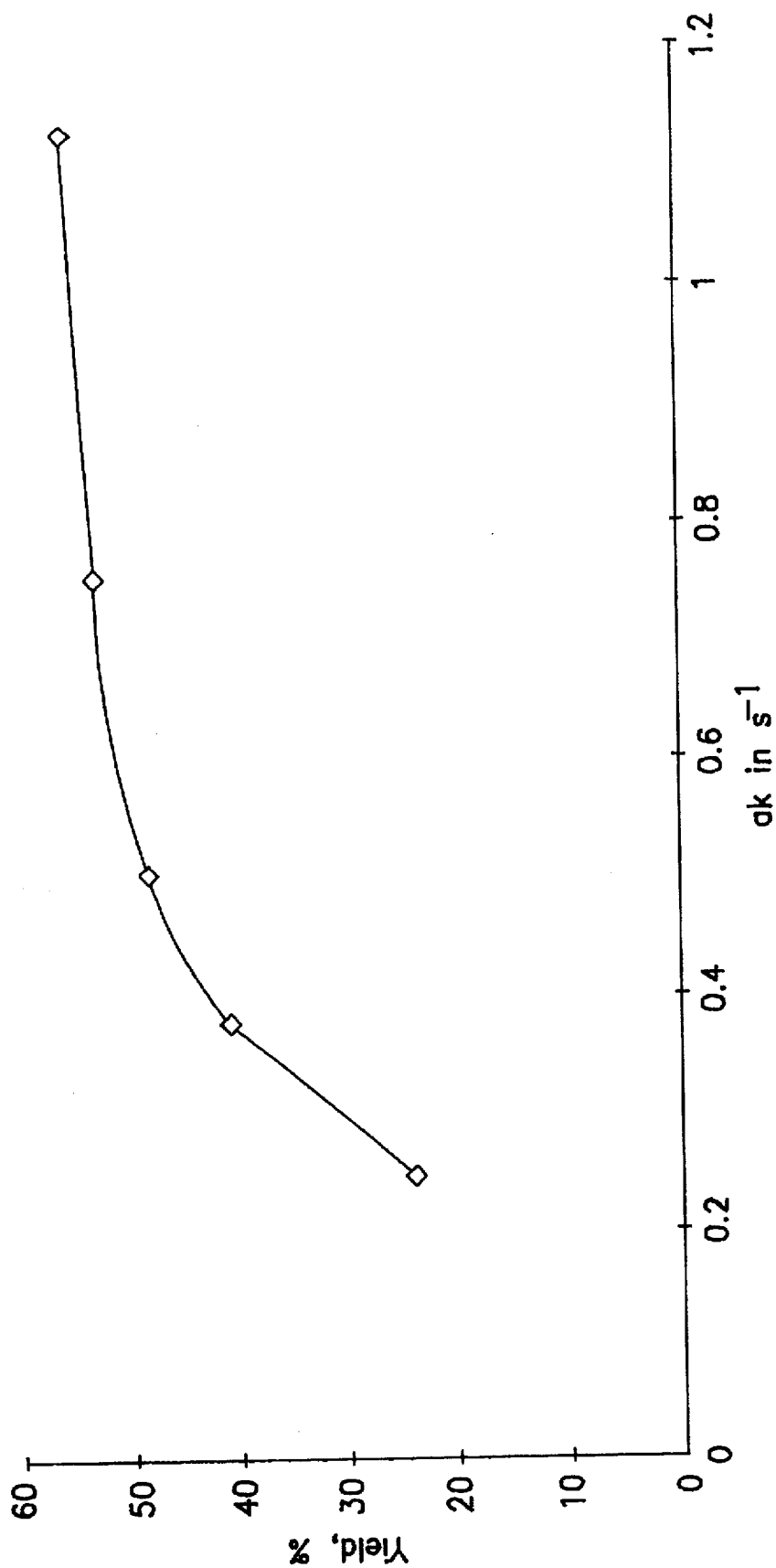
FIG. 2 shows the change in the yield of the PSA cycle of FIG. 1 as a function of the kinetic parameter $a_k$ for constant values of the porosity and of the Si/Al ratio of a zeolite of 5A type.
Figure 3:
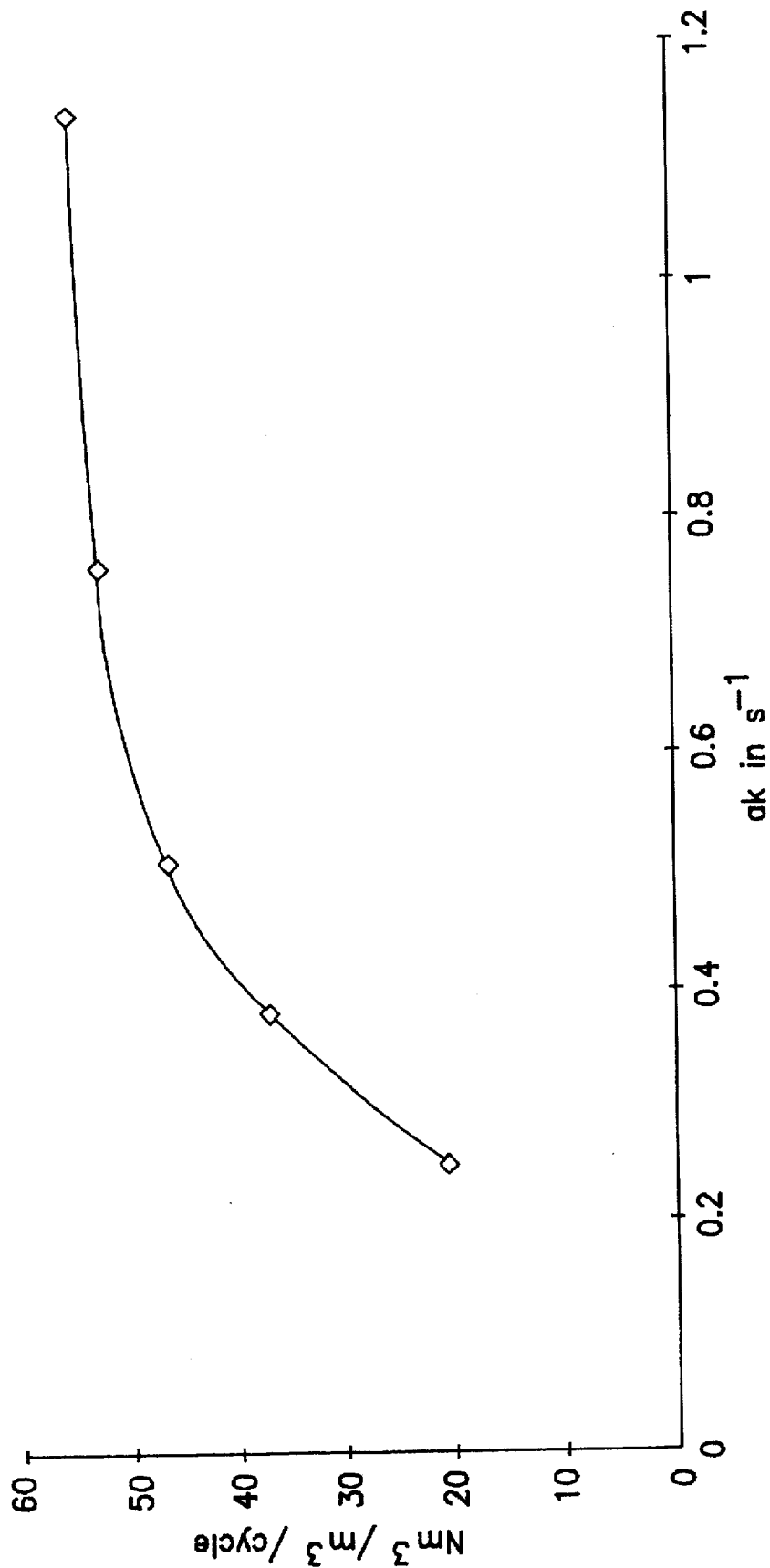
FIG. 3 is a representation of the change in the space time yield of the PSA cycle of FIG. 1 as a function of the kinetic parameter $a_k$ in the same conditions as in FIG. 2.

A simulation of the PSA cycle makes it possible to define the variations in the yield (%) and in the output efficiency (m$^3$/m$^3$/cycle) as a function of the variations in the parameter $a_k$ (s$^{-1}$). These have been shown in the appended FIGS. 2 and 3, respectively. It is concluded that the performance values decrease very rapidly below a value of 0.5 s$^{-1}$. It can thus be seen that the kinetic factor has a great influence on the performance values and that a limiting lower value exists. Nevertheless, a person skilled in the art knows that the duration of the treatment cycle must be taken into account in order to determine the optimum kinetic parameter $a_k$. Thus, the shorter this period, the larger will be $a_k$.

Example 2

In this example the influence of the porosity on the performance of the PSA cycle was investigated in terms of yield (%), hourly space time yield per unit mass of adsorbent (m$^3$/h/t) and hourly space time yield per unit volume of adsorbent (m$^3$/h/m$^3$) for three constant values of the kinetic parameter $a_k$, namely 0.55 s$^{-1}$, 0.75 s$^{-1}$ and 1.00 s$^{-1}$.

The adsorbents chosen as reference are zeolites exhibiting, respectively, the following values of $a_k$, of porosity and of macropore size:

$a_k = 0.55$ s$^{-1}$ with a porosity of 0.34 and a mean macropore size of 0.25 µm;

$a_k = 0.75$ s$^{-1}$ with a porosity of 0.34 and a mean macropore size of 0.4 µm; and $a_k = 1.00$ s$^{-1}$ with a porosity of 0.34 and a mean macropore size of 0.55 µm.

The zeolite of $a_k = 0.75$ s$^{-1}$ is zeolite 5A marketed by Bayer under reference KEG 407, employed in Example 1.

The zeolites of $a_k = 0.55$ s$^{-1}$ and $a_k = 1.00$ s$^{-1}$ are prepared by screening zeolite 5A, reference KEG 407, with a view to increasing or reducing the mean size of the zeolite particles.

It will be noted that the value of $a_k$ is inversely proportional to the square of the mean particle size.

The porosity is therefore varied for each value of $a_k$ by simulation.

The results obtained with regard to the performance values of the PSA process have been plotted in the appended FIGS. 4 to 6.

More precisely, FIG. 4 relates to the variations in the yield (%) □ and of the hourly space time yield (expressed in m³/h/t △, and in m³/h/m³ ◇, respectively) as a function of the porosity for an $a_k$ of 0.55 s$^{-1}$;

FIG. 5 relates to the variations in the yield (%) □ and of the hourly space time yield (expressed in m³/h/t △, and in m³/h/m³ ◇, respectively) as a function of the porosity for an $a_k$ of 0.75 s$^{-1}$; and FIG. 6 relates to the variations in the yield (%) □ and of the hourly space time yield (expressed in m³/h/t △, and in m³/h/m³ ◇, respectively) as a function of the porosity for an $a_k$ of 1.00 s$^{-1}$.

It is found that with a porosity value ϵ of between 0.38 and 0.60 there is a net advantage in terms of yield and hence in energy. The output efficiency per volume of adsorbent, for its part, is practically constant, whereas the output efficiency per mass of adsorbent increases in the case of these particular values of the porosity. There is therefore every advantage from the viewpoint of the investment in selecting a zeolite exhibiting a porosity of between 0.38 and 0.60, the output efficiency determining the investment, especially in adsorbent.

It is therefore clearly apparent that the present invention is particularly advantageous in the case where the use of high-performance and costly zeolites, such as faujasites containing lithium, is envisaged.

We claim:

1. Process for the separation of a mixture of oxygen and nitrogen into each of its constituents, which comprises: bringing the mixture, in an adsorption zone, into contact with a selective adsorbent for nitrogen, said adsorbent being an agglomerated zeolite exhibiting an Si/Al ratio lower than 5, a porosity of between 0.38 and 0.60, and a parameter $a_k$ of at least 0.5 s$^{-1}$, said parameter $a_k$ characterizing the kinetics of adsorption of nitrogen on said adsorbent in said adsorption zone in accordance with a Linear Driving Force model, wherein when the adsorbent is a zeolite containing lithium, the porosity ranges between 0.25 and 0.60.

2. Process according to claim 1, wherein the mixture of oxygen and nitrogen includes more than 10% by volume of nitrogen.

3. Process according to claim 1, wherein the Si/Al ratio is between 1 and 1.5.

4. Process according to claim 1, wherein the agglomerated zeolite is erionite or chabazite.

5. Process according to claim 1, wherein the agglomerated zeolite is chosen from zeolites 5A, 13X and CaX.

6. Process according to claim 1, wherein the agglomerated zeolite is exchanged with metal ions derived from lithium, optionally exhibiting divalent metal cations in its crystal lattice.

7. Process according to claim 6, wherein the agglomerated zeolite is a faujasite exchanged to at least 80% with lithium.

8. Process according to claim 7, wherein the faujasite is exchanged to at least 86% with lithium.

9. Process according to claim 7, wherein the porosity of the faujasite exchanged to at least 80% with lithium is between 0.30 and 0.60.

10. Process according to claim 9, wherein the porosity of the faujasite exchanged to at least 80% with lithium is between 0.38 and 0.55.

11. Process according to claim 7, wherein the mean size of the macropores of the faujasite exchanged to at least 80% with lithium is greater than 0.25 μm.

12. Process according to claim 1, wherein the porosity of the adsorbent is between 0.38 and 0.50.

13. Process according to claim 1, wherein the parameter $a_k$ characterizing the adsorbent in the adsorption zone is between 0.5 and 4 s$^{-1}$.

14. Process according to claim 13, wherein the parameter $a_k$ is between 1.5 and 4 s$^{-1}$.

15. Process according to claim 1, wherein the mean size of the macropores of the adsorbent is greater than 0.35 μm.

16. Process for the separation of a gaseous effluent containing a mixture of nitrogen and oxygen, in a treatment cycle which comprises the following stages:

a) passing the gaseous effluent into an absorption zone including a selective adsorbent for nitrogen, said adsorbent being an agglomerated zeolite exhibiting an Si/Al ratio lower than 5, a porosity of between 0.38 and 0.60, and a parameter $a_k$, characterizing the kinetics of adsorption of nitrogen on said adsorbent in said adsorption zone in accordance with a Linear Driving Force model, of at least 0.5 s$^{-1}$, wherein when the adsorbent is a zeolite containing lithium, the porosity ranges between 0.25 and 0.60 whereby the mixture of nitrogen and oxygen is brought into contact with the zeolite, a gaseous effluent enriched in oxygen is recovered at the exit of the adsorption zone, with the nitrogen selectively adsorbed on said adsorbent;

b) desorbing the nitrogen adsorbed on the adsorbent present in the adsorption zone by lowering the partial pressure of nitrogen within the adsorption zone; and c) restoring the adsorption zone to pressure by the introduction of a stream of oxygen or air.

17. Process according to claim 16, wherein during stage a) the adsorption zone is fed with a gaseous mixture of nitrogen and oxygen at a pressure between 1×10⁶ Pa and 1×10⁵ Pa and at a temperature of between −20° and +80° C.

18. Process according to claim 16, wherein in stage b) the oxygen pressure within the adsorption zone is between 1×10⁴ Pa and 1×10⁵ Pa.

19. Process according to claim 16, wherein the duration of the treatment cycle is between 30 and 180 seconds.

\* \* \* \* \*